(12) United States Patent
Ikai et al.

(10) Patent No.: US 9,893,674 B2
(45) Date of Patent: Feb. 13, 2018

(54) MOTOR CONTROL DEVICE INCLUDING TORQUE COMMAND LIMIT UNIT

(71) Applicant: FANUC CORPORATION, Yamanashi (JP)

(72) Inventors: Satoshi Ikai, Yamanashi (JP); Yuuki Kumamoto, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/443,157

(22) Filed: Feb. 27, 2017

(65) Prior Publication Data
US 2017/0250644 A1 Aug. 31, 2017

(30) Foreign Application Priority Data
Feb. 29, 2016 (JP) .................................. 2016-038090

(51) Int. Cl.
*H02P 29/024* (2016.01)
*H02P 6/08* (2016.01)
*H02P 27/08* (2006.01)
*B23Q 5/58* (2006.01)

(52) U.S. Cl.
CPC .............. *H02P 29/025* (2013.01); *B23Q 5/58* (2013.01); *H02P 6/08* (2013.01); *H02P 27/08* (2013.01)

(58) Field of Classification Search
CPC .. H02P 29/025; H02P 6/08; H02P 6/10; H02P 6/28; H02P 27/08; H02P 29/00; H02P 29/024; B23Q 11/0089; B23Q 11/0092; B23Q 5/58

USPC .................................................. 318/479, 375
See application file for complete search history.

(56) References Cited

U.S. PATENT DOCUMENTS

| 4,095,154 A * | 6/1978 | Williamson | H02P 3/06 318/376 |
| 7,880,345 B2 * | 2/2011 | Hoffmann | H02K 7/06 310/12.13 |
| 8,054,015 B2 * | 11/2011 | Iwashita | H02P 3/18 318/372 |
| 8,803,458 B2 * | 8/2014 | Horikoshi | H02P 27/06 318/400.01 |
| 9,092,027 B2 * | 7/2015 | Okita | G05B 19/4062 |

(Continued)

FOREIGN PATENT DOCUMENTS

| JP | 5612058 B | 10/2014 |
| JP | 5746276 B | 7/2015 |
| JP | 2016-25828 A | 2/2016 |

*Primary Examiner* — Rita Leykin
(74) *Attorney, Agent, or Firm* — RatnerPrestia

(57) ABSTRACT

A motor control device includes: a power failure detection unit that detects a power failure; a voltage detection unit that detects a DC link voltage; a switch unit which connects a motor to an amplifier or a resistance; a voltage comparison unit which compares a DC link voltage with a threshold value; a limit value setting unit which sets a torque limit value in accordance with a result of comparison; a torque command limit unit which limits a torque command when a power failure is detected; a prediction value calculation unit which calculates, using an angular velocity, a torque prediction value of the motor when the motor is connected to the resistance; and a torque comparison unit which compares the torque limit value with the torque prediction value, in which in accordance with a result of comparison, the switch unit connects the motor to the amplifier or the resistance.

9 Claims, 5 Drawing Sheets

(56) References Cited

U.S. PATENT DOCUMENTS

| | | | |
|---|---|---|---|
| 9,248,539 B2* | 2/2016 | Tajima | H02P 6/00 |
| 9,515,581 B2* | 12/2016 | Ogawa | H02P 3/22 |
| 2003/0102833 A1* | 6/2003 | Murakami | H02P 6/24 |
| | | | 318/362 |
| 2004/0160208 A1* | 8/2004 | Youm | H02P 3/22 |
| | | | 318/801 |
| 2011/0068728 A1* | 3/2011 | Kuratani | H02M 1/32 |
| | | | 318/490 |
| 2016/0028331 A1* | 1/2016 | Hashimoto | H02P 29/025 |
| | | | 318/479 |

* cited by examiner

Y-Δ TRANSFORMATION

PER PHASE

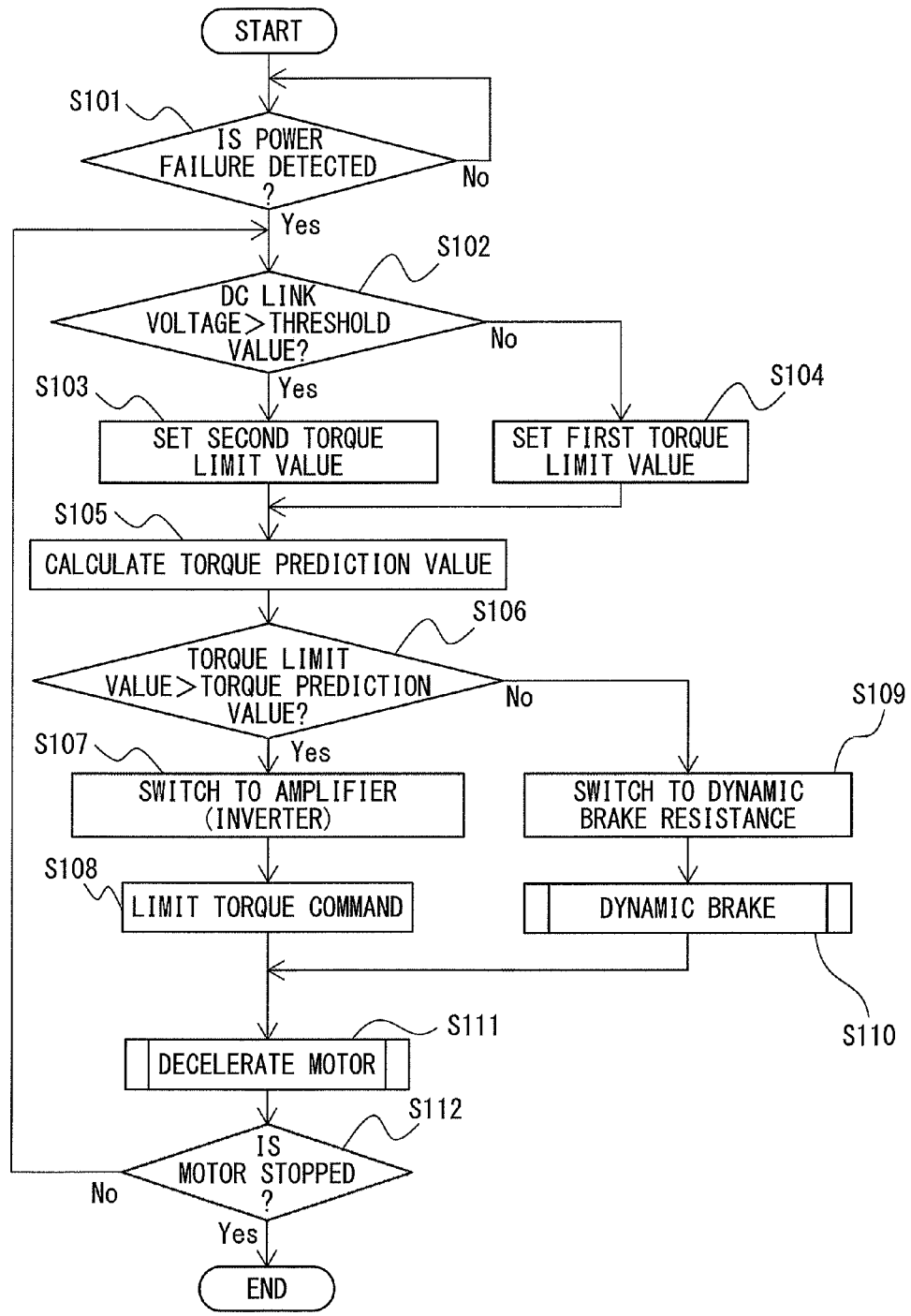

MOTOR CONTROL DEVICE INCLUDING TORQUE COMMAND LIMIT UNIT

BACKGROUND OF THE INVENTION

1. Field of the Invention

The present invention relates to a motor control device, and more particularly, to a motor control device which urgently stops a motor at the time of a power failure of a power source.

2. Description of the Related Art

In a motor control device which controls a motor in a machine tool or an industrial machine, alternating current power at an alternating current power source side is converted to direct current power to output the direct current power to a DC link, and then the direct current power is further converted by an amplifier to alternating current power, which is supplied as drive power of the motor.

When a power source which supplies electric power for driving the motor has been stopped, it is preferable to stop the motor which drives a feed axis and the like in a machine tool as soon as possible.

For example, as disclosed in Japanese Patent No. 5612058, in a machine tool including a feed axis motor which drives a feed axis and a main axis motor which drives a main axis, there is known a method of avoiding an overvoltage alarm or a low voltage alarm by decelerating the feed axis motor, and accelerating or decelerating the main axis motor in accordance with a value of a DC link voltage when a power failure occurs at an alternating current power source side.

Further for example, as disclosed in Japanese Patent No. 5746276, in a machine tool including a feed axis motor which drives a feed axis and a main axis motor which drives a main axis, there is known a method capable of securely stopping the feed axis motor at an early stage by performing command to output an excitation current larger than an excitation current commanded by a master control means to the main axis motor if an operation of the feed axis motor satisfies a predetermined determination condition even when a power failure occurs at an alternating current power source side, and of restraining heat generation of the main axis motor at the time of a normal operation.

Still further, for example, as disclosed in Japanese Unexamined Patent Publication (Kokai) No. 2016-25828, there is known a motor control device that quickly stops a motor which drives a feed axis, while avoiding an overvoltage alarm after a power failure.

As methods of decelerating the motor, there are a method of generating a deceleration torque in the motor (hereinafter referred to as "deceleration by control"), and a method of applying a dynamic brake by connecting a resistance to the motor and allowing a current to flow therethrough, thereby allowing energy to be consumed (hereinafter referred to as "deceleration by hardware"). When a power failure occurs, power supply from the power source to the motor is interrupted, and thus the "deceleration by control" is performed using electric power as accumulated in the DC link. Since in general, a distance until the motor stops (so-called braking distance) by the "deceleration by control" is shorter than that by the "deceleration by hardware", to urgently stop the motor because of a power failure, securing a long time for the "deceleration by control" within limited electric power is preferable.

Usually, when a motor is decelerating, due to a regenerative operation, motive energy decreases and electric power (electric energy) increases, in urgently stopping the motor when a power failure occurs, a time of the "deceleration by control" can be secured to be long within limited electric power.

However, depending on specifications of the motor, there occurs a situation in which when the deceleration torque is allowed to be too large in the "deceleration by control", instead of regeneration, powering that consumes electric power is performed, which consumes limited electric power. FIG. 5 is a circuit diagram illustrating an equivalent circuit of the motor per phase. Further, FIG. 6 is a diagram illustrating a relationship between a winding current of the motor and electric power. Assuming that the winding current of the motor is i [A], a terminal voltage of the motor is V [V], an angular velocity of the motor is w (t) [rad/sec], a winding resistance of the motor per phase is R [a], an inductance per phase is L [H], and a counter electromotive force coefficient of the motor is Kv [V×sec/rad], an electric power P [W] of the motor is represented by expression 1.

$$P = Vi \qquad (1)$$
$$= Ri^2 + Li\frac{di}{dt} - K_v\omega(t)i$$

In expression 1, let the current be constant (di/dt=0), and rearrangement is made with respect to the winding current i of the motor, which becomes as expression 2.

$$P = R\left(i - \frac{K_v\omega}{2R}\right)^2 - \frac{K_v^2\omega^2}{4R} \qquad (2)$$

As represented by expression 2, the electric power P of the motor is represented by a quadratic function of the winding current i of the motor, which is illustrated by a graph as FIG. 6. In FIG. 6, the horizontal axis represents the winding current i of the motor, and the vertical axis represents the electric power P of the motor. As apparent from FIG. 6, if the winding current i of the motor is less than Kvω/R, regeneration of the electric power is performed due to deceleration of the motor, whereas if the winding current i of the motor is no less than Kvω/R, consumption of the electric power is performed due to deceleration of the motor. Because the torque of the motor is proportional to the winding current of the motor, it is apparent from expression 2 and FIG. 6 that depending on specifications of the motor, when the deceleration torque is allowed to be too large in the "deceleration by control", instead of regeneration, a powering operation which consumes the electric power is performed.

In urgently stopping the motor when a power failure occurs, if the deceleration torque is allowed to be too large in the "deceleration by control" so that consumption of electric power is performed, and electric power in the DC link decreases, a device (common power source) which supplies the power source comes to fail to supply electric power, and the low voltage alarm is generated in an amplifier (inverter). When the low voltage alarm is generated, a switch from the "deceleration by control" to the "deceleration by hardware" is made. If such a switch is made early, the distance for the motor to stop (braking distance) is lengthened.

SUMMARY OF INVENTION

It is an object of the invention to provide a motor control device which can shorten a stopping distance of a motor, while avoiding generation of a low voltage alarm after a power failure of a power source.

In order to achieve the above-described object, a motor control device which controls a motor in a machine tool or an industrial machine includes: a power failure detection unit that detects a power failure of a power source which supplies electric power for driving the motor; a DC link voltage detection unit that detects a value of a DC link voltage applied to an amplifier which drives the motor; a switch unit which switches a connection destination of the motor to the amplifier or a dynamic brake resistance; a voltage comparison unit which compares the value of the DC link voltage with a predetermined threshold value; a torque limit value setting unit which sets a torque limit value for decelerating the motor in accordance with a result of a comparison by the voltage comparison unit; a torque command limit unit which limits a torque command for driving the motor to the torque limit value when the motor is connected to the amplifier at the time of the detection of the power failure; a velocity detection unit which detects an angular velocity of the motor; a torque prediction value calculation unit which calculates, using the angular velocity detected by the velocity detection unit, a deceleration torque of the motor that is predicted to be generated when the motor rotating at the angular velocity is connected to the dynamic brake resistance as a torque prediction value; and a torque comparison unit which compares the torque limit value set by the torque limit value setting unit with the torque prediction value calculated by the torque prediction value calculation unit, in which in accordance with a result of a comparison by the torque comparison unit, the switch unit switches the connection destination of the motor when the power failure is detected to the amplifier or the dynamic brake resistance.

Then, it is also possible that as a result of the comparison by the torque comparison unit, the switch unit switches the connection destination of the motor to the amplifier when the torque limit value is greater than the torque prediction value, and switches the connection destination of the motor to the dynamic brake resistance when the torque limit value is less than the torque prediction value. It is assumed that the angular velocity detected by the velocity detection unit is $\omega$, a counter electromotive force coefficient of the motor is $K_V$, a torque constant is $K_T$, an impedance per phase when a Y connection of a winding in the motor is transformed to a delta connection is Z, a resistance value of the dynamic brake resistance is $R_{DB}$, and the torque prediction value is $T_{DB}$.

The torque prediction value calculation unit may calculate the torque prediction value $T_{DB}$ based on the below expression;

$$T_{DB} = Re\{K_V K_T \omega (Z + R_{DB})^{-1}\} \quad (3)$$

Herein, Re represents a real part of a complex number.

Moreover, it is also possible that as a result of the comparison by the voltage comparison unit, the torque limit value setting unit sets a first torque limit value when the value of the DC link voltage is less than the predetermined threshold value, and sets a second torque limit value greater than the first torque limit value when the value of the DC link voltage is no less than the predetermined threshold value.

Further, it is also possible that the above predetermined threshold value is a fixed value which is set in advance.

Moreover, it is also possible that the motor control device further includes a retention unit which retains a value of the DC link voltage detected by the DC link voltage detection unit for each predetermined cycle time, in which the above predetermined threshold value may be a value of the DC link voltage that has been detected in a cycle time previous to a cycle time, in which the DC link voltage as used for a comparison by the voltage comparison unit is detected, and has been retained by the retention unit.

Further, it is also possible that as the first torque limit value when the value of the DC link voltage is less than the predetermined threshold value, a torque limit value setting unit sets such torque limit value that is determined based on the angular velocity detected by the velocity detection unit and allows a decrease of the DC link voltage to be restrained. Moreover, it is assumed that the angular velocity detected by the velocity detection unit is $\omega$, a counter electromotive force coefficient of the motor is Kv, a torque constant is $K_T$, a winding resistance is R, and the angular velocity is $\omega$.

The torque limit value setting unit may set the first torque limit value in such a manner as to be a value not greater than $T_{upper}$ which is calculated based on the below expression.

$$T_{upper} = \frac{K_V K_T \omega}{R} \quad (4)$$

Further, it is also possible that the torque limit value setting unit sets the second torque limit value when the value of the DC link voltage is no less than the predetermined threshold value in such a manner as to be a value not greater than a maximum torque allowable for the motor.

BRIEF DESCRIPTION OF THE DRAWINGS

The present invention will be understood more clearly by referring to the following accompanying drawings:

FIG. 4 is a flowchart illustrating an operation flow of the motor control device according to the embodiment;

DETAILED DESCRIPTION

A motor control device including a torque command limit unit will be described below with reference to the drawings. However, it should be understood that the invention is not limited to the drawings or embodiments described below.

Figure 1:
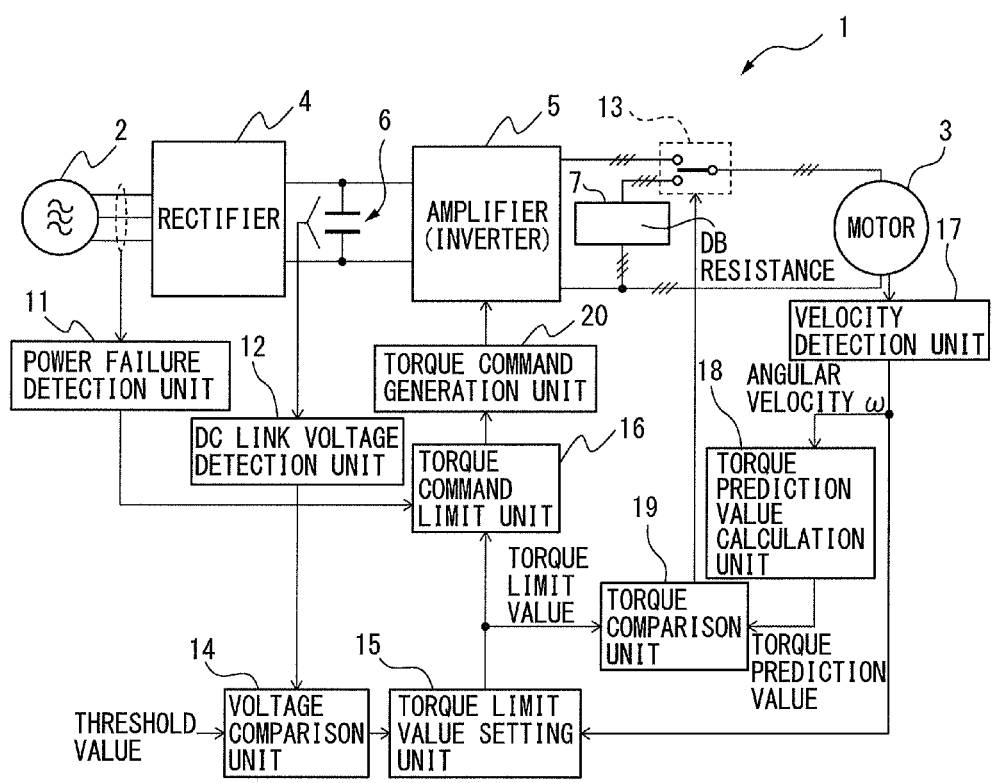
FIG. 1 is a block diagram of a motor control device according to an embodiment.

FIG. 1 is a block diagram of a motor control device according to an embodiment. Hereinafter, it is assumed that the elements denoted by the same reference signs in different drawings mean elements having the same functions. Note that in FIG. 1 and FIG. 2 which will be later described, to simplify the drawings, the wiring related to a three-phase alternating current motor 3 is illustrated by combination of one wiring "-" and three oblique lines "///" in accordance with the common practice.

A motor control device 1 according to the embodiment converts alternating current power supplied from an alternating current power source (hereinafter, occasionally simply referred to power source) 2 to electric power suitable for driving the motor 3 and supplies the electric power to the motor 3. The motor 3 may be any three-phase alternating current motor, and may be either of an induction motor or a synchronous motor. The motor 3 is used as a drive source for, for example, a feed axis and a main axis of a machine tool, or an arm and the like of an industrial machine and an industrial robot. Note that in the example as depicted, the number of phases of the alternating current power source 2 is three, but the number of phases of the power source of the alternating current power source 2 is not to particularly limit the present invention, and in addition to the three phase, for example, a single phase or other polyphase alternating current power source may be configured. Examples of the alternating current power source 2 include a three phase alternating current 400 V power source, a three phase alternating current 200 V power source, a three phase alternating current 600 V power source, a single phase alternating current 100 V power source, and the like.

In the motor control device 1, the alternating current power inputted from an alternating current power source 2 side is converted by a rectifier 4 to direct current power and the direct current power is outputted to a DC link. In the DC link, for the purpose of restraining a pulsating component of a direct current output of the rectifier 4 and accumulating direct current power, a DC link capacitor 6 is provided. A voltage of the DC link (hereinafter, "DC link voltage") is applied to an amplifier 5 which drives the motor 3. The amplifier 5 is configured with an inverter (three phase inverter) made of a full bridge circuit of semiconductor switching elements, converts the DC link voltage to an alternating current voltage by the switching element being driven and turned on or off in accordance with a switching command generated based on a torque command, and supplies drive power to the motor 3. Further, the amplifier 5 can convert, as described below, alternating current power regenerated in the motor 3 to direct current power and output the direct current power to the DC link. Note that a type and a configuration of the rectifier 4 and the amplifier 5 are not to particularly limit the present invention.

The motor control device 1 according to the present embodiment includes a power failure detection unit 11, a DC link voltage detection unit 12, a switch unit 13, a voltage comparison unit 14, a torque limit value setting unit 15, a torque command limit unit 16, a velocity detection unit 17, a torque prediction value calculation unit 18, a torque comparison unit 19, a torque command generation unit 20, and a dynamic brake resistance 7.

The power failure detection unit 11 detects a power failure of the alternating current power source 2 which supplies electric power for driving the motor 3. A power failure detection method itself is not to particularly limit the present invention, but, for example, there is a method of coordinate transforming a three phase alternating current input voltage at the alternating current power source 2 side of the rectifier 4 to a voltage vector on two phase coordinates which is equivalent thereto, calculating an amplitude of the vector, thereby calculating an amplitude value of a power source voltage, and detecting a power failure when a state in which the amplitude value falls below a predetermined reference voltage value continues for a predetermined reference time. When the power failure detection unit 11 detects a power failure of the alternating current power source 2, a power failure detection signal indicative of detecting a power failure is transmitted to the torque command limit unit 16.

The DC link voltage detection unit 12 detects a value of the DC link voltage applied to the amplifier 5 which drives the motor 3. The value of the DC link voltage detected by the DC link voltage detection unit 12 is transmitted to the voltage comparison unit 14.

The dynamic brake resistance 7 is provided via the switch unit 13 which will be later described between input terminals of the motor 3 (in other words, between phases of a motor winding). If a connection destination of the motor 3 is switched by the switch unit 13 from the amplifier 5 to the dynamic brake resistance 7, a short circuit occurs between the input terminals of the motor 3 (between the phases of the motor winding), but in the meantime, a field magnetic flux is present in the motor 3, thus the motor 3 rotating under its own inertia functions as an electric generator, a current thereby generated flows via the switch unit 13 into the dynamic brake resistance 7 and is consumed as Joule heat, and a deceleration torque is generated in the motor 3. Note that because in FIGS. 1 and 2, the wiring related to the three-phase alternating current motor 3 is illustrated by combination of one wiring "-" and three oblique lines "///", the dynamic brake resistance 7 and the switch unit 13 are illustrated in a one-piece manner.

The switch unit 13 switches the electrical connection destination of the motor 3 to the amplifier 5 or the dynamic brake resistance 7. In a normal state in which the motor control device 1 controls the drive of the motor 3, the switch unit 13 electrically connects the motor 3 to the amplifier 5, whereby the amplifier 5 converts direct current power in the DC link to alternating current power and supplies the alternating current power to the motor 3, or converts alternating current power regenerated from the motor 3 to direct current power and outputs the direct current power to the DC link. If the power failure detection unit 11 detects a power failure of the alternating current power source 2, in accordance with a result of comparison by the torque comparison unit 19 which will be later described, the connection destination of the motor 3 is switched to the amplifier 5 or the dynamic brake resistance 7. The switch unit 13 will be later described in detail. Note that a type and a configuration of the switch unit 13 are not to particularly limit the present invention.

The voltage comparison unit 14 compares the value of the DC link voltage detected by the DC link voltage detection unit 12 with a predetermined threshold value. The threshold value will be later described in detail.

The torque command generation unit 20 generates the torque command for driving the motor 3. The amplifier (inverter) 5 outputs alternating current power to the motor 3 (electric power supply operation) or causes the alternating current power inputted from the motor 3 (electric power regeneration operation) such that the motor 3 can perform a rotation operation using torque in accordance with the torque command. For example, when the amplifier 5 is a PWM control type inverter, the torque command generated by the torque command generation unit 20 is transformed to a PWM control signal for PWM controlling a switching operation of each semiconductor switching element in the amplifier (inverter) 5 and the PWM control signal is transmitted to each semiconductor switching element in the amplifier 5.

The torque limit value setting unit 15 sets a torque limit value in accordance with a result of comparison by the voltage comparison unit 14. The torque limit value set by the torque limit value setting unit 15 is transmitted to the torque command limit unit 16.

Then, the torque limit value and the threshold value will be described further in detail.

Figure 5:
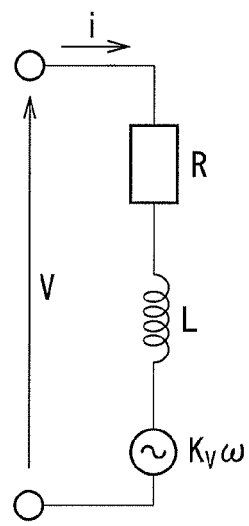
FIG. 5 is a circuit diagram illustrating an equivalent circuit of the motor per phase.
Figure 6:
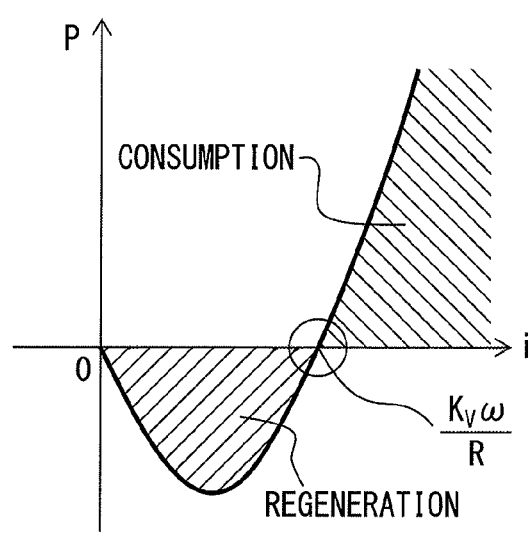
FIG. 6 is a diagram illustrating a relationship between a winding current of the motor and electric power.

As described with reference to FIGS. 5 and 6, in deceleration by generating a deceleration torque in the motor 3 ("deceleration by control"), whether the motor 3 regenerates the electric power and whether the motor 3 consumes the electric power are switched in accordance with the magnitude of the deceleration torque. As apparent from FIG. 6, when a winding current i of the motor 3 is less than $K_V\omega/R$, regeneration of electric power is performed if a deceleration torque is generated in the motor 3, and when the winding current i of the motor 3 is no less than $K_V\omega/R$, consumption of electric power is performed if a deceleration torque is generated in the motor 3. If this is reworded in terms of torque T, with a torque constant $K_T$ [N/Arms], the torque T is then represented by "$K_T i$" and thus "if the torque T of the motor 3 is less than $K_V K_t\omega/R$, regeneration of electric power is performed if the motor 3 is allowed to generate a deceleration torque, and when the torque T of the motor 3 is no less than $K_V K_t\omega/R$, consumption of electric power is performed when a deceleration torque is generated in the motor 3". Because when a power failure occurs at the alternating current power source 2 side of the rectifier 4, direct current power is no more outputted from the rectifier 4, it is preferable to perform the "deceleration by control", which is deceleration by generating a deceleration torque in the motor 3 in the meantime, using electric power as accumulated in the DC link. There is an advantage that the larger the deceleration torque is, the shorter a stopping distance (braking distance) of the motor 3 become, but if the torque T is no less than $K_V K_t\omega/R$, electric power is consumed by the motor 3 regardless of deceleration of the motor 3 so that it is possible that the DC link voltage decreases and a low voltage alarm is generated in the amplifier 5. On the other hand, there is a disadvantage that the smaller the deceleration torque is, the longer the stopping distance (braking distance) of the motor 3 becomes, but if the torque T is less than $K_V K_t\omega/R$, electric power is regenerated from the motor 3 due to deceleration of the motor 3 so that the DC link voltage does not decrease and the low voltage alarm is not generated. Then, in the torque limit value setting unit 15, when a power failure of the alternating current power source 2 occurs, to stop the motor 3 in a time as short as possible while avoiding generation of the low voltage alarm, if the value of the DC link voltage is less than the predetermined threshold value, a first torque limit value $T_{lim1}$ is set, and if the value of the DC link voltage is no less than the predetermined threshold value, a second torque limit value $T_{lim2}$ greater than the first torque limit value $T_{lim1}$ is set. In other words, a relationship of "the first torque limit value $T_{lim1}$<the second torque limit value $T_{lim2}$" holds true. Thus, in the torque limit value setting unit 15, the torque limit value from either one of the first torque limit value $T_{lim1}$ or the second torque limit value $T_{lim2}$ is set in accordance with the value of the DC link voltage.

As the first torque limit value $T_{lim1}$ when the value of the DC link voltage is less than the predetermined threshold value, the torque limit value which is determined based on the angular velocity detected by the velocity detection unit 17 and allows a decrease of the DC link voltage to be restrained is set. As described above, if the torque T is less than $KvK_t\omega/R$, electric power is regenerated from the motor 3 due to deceleration of the motor 3, thus if the first torque limit value $T_{lim1}$ is set in such a manner as to be a value not greater than $KvK_t\omega/R$ ($=T_{upper}$), the DC link voltage fails to decrease even when the torque command is limited to the first torque limit value $T_{lim1}$. In other words, the upper limit value $T_{upper}$ of the first torque limit value $T_{lim1}$ is $KvK_t\omega/R$.

On the other hand, the second torque limit value $T_{lim2}$ when the value of the DC link voltage is no less than the predetermined threshold value may be set to be a value greater than the first torque limit value $T_{lim1}$ as described above, but an upper limit value thereof is a maximum torque allowable for the motor 3. When the value of the DC link voltage is no less than the predetermined threshold value, electric power as accumulated in the DC link can be considered to be in a comparatively affordable state, and thus the "deceleration by control" which is deceleration by generating a deceleration torque in the motor 3 may be performed within a range not exceeding the maximum torque allowable for the motor 3.

Then, the above predetermined threshold value may be set as a fixed value which is set in advance.

Figure 2:
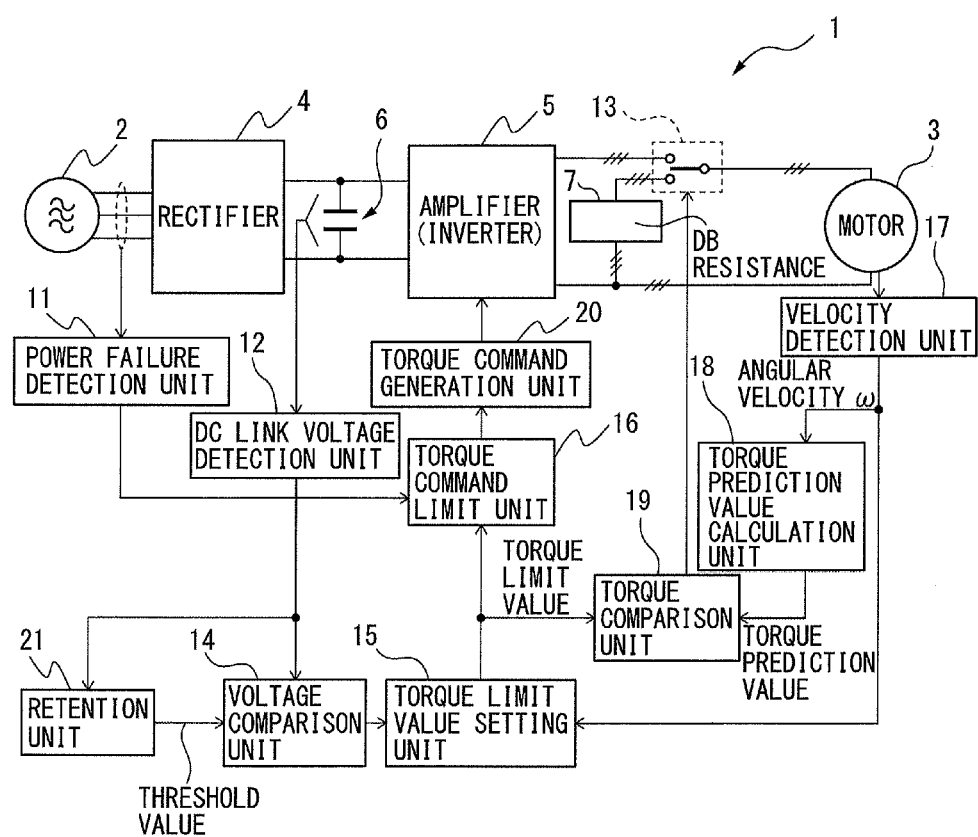
FIG. 2 is a block diagram of the motor control device according to another embodiment.

Alternatively, as the above predetermined threshold value, a value of the DC link voltage detected in a cycle time previous to a cycle time in which the DC link voltage as used for a comparison by the voltage comparison unit 14 is detected may be set. FIG. 2 is a block diagram of the motor control device according to another embodiment. The DC link voltage detection unit 12 detects a value of the DC link voltage over a predetermined cycle time, but by providing a retention unit 21 that once retains the value of the DC link voltage detected by the DC link voltage detection unit 12, the voltage comparison unit 14 can compare the value of the DC link voltage detected by the DC link voltage detection unit 12 with a value of the DC link voltage detected in a cycle time previous to a cycle time in which the DC link voltage is detected (in other words, the threshold value). Providing the retention unit 21 enables a determination of whether the DC link voltage has a tendency to increase or decrease in the voltage comparison unit 14. Accordingly, the motor 3 can be stopped in a time as short as possible while avoiding generation of the low voltage alarm in a more reliable manner. For example, when a value of the DC link voltage is less than a value of the DC link voltage detected in a cycle time previous to a cycle time in which the DC link voltage is detected (i.e. value retained by the retention unit 21 as the threshold value), the DC link voltage has a tendency to decrease, and thus the first torque limit value $T_{lim1}$ is set, and when a value of the DC link voltage is no less than a value of the DC link voltage detected in a cycle time previous to a cycle time in which the DC link voltage is detected (i.e. value retained by the retention unit 21 as the threshold value), the DC link voltage has a tendency to increase, and thus the second torque limit value $T_{lim2}$ greater than the first torque limit value $T_{lim1}$ is set.

Thus, the torque limit value setting unit 15 sets either one of the first torque limit value $T_{lim1}$ and the second torque limit value $T_{lim2}$ based on a result of a comparison process by the voltage comparison unit 14 using the threshold value.

Returning to FIG. 1, the torque command limit unit 16 limits the torque command generated by the torque command generation unit 20 to the torque limit value set by the torque limit value setting unit 15 when a power failure is detected by the power failure detection unit 11. In other words, when a power failure is detected, the torque limit value as the torque command is outputted from the torque command generation unit 20, the torque limit value is transformed to the switching command for controlling the switching operation of each semiconductor switching element in the amplifier (inverter) 5, and transmitted to each semiconductor switching element in the amplifier 5, based on which the amplifier 5 performs an electric power conversion operation. Note that effects of limiting the torque command by the torque command limit unit 16 when a power failure is detected are valid if the motor 3 and the amplifier 5 are electrically connected to each other.

The velocity detection unit 17 detects an angular velocity of the motor 3 as driven. The angular velocity detected by the velocity detection unit 17 is transmitted to the torque limit value setting unit 15.

The torque prediction value calculation unit 18 calculates, using the angular velocity detected by the velocity detection unit 17, a deceleration torque of the motor 3 which is predicted to be generated when it is assumed that the motor 3 rotating at the angular velocity is electrically connected by the switch unit 13 to the dynamic brake resistance 7 as a torque prediction value. A calculation process of the torque prediction value by the torque prediction value calculation unit 18 is to be cyclically executed regardless of whether the electrical connection destination of the motor 3 via the switch unit 13 is the amplifier 5 or the dynamic brake resistance 7, and is to predictively calculate a deceleration torque which is likely to be generated in the motor 3 when it is assumed that "the motor 3 rotates at the angular velocity detected by the velocity detection unit 17, while the motor 3 and the dynamic brake resistance 7 are electrically connected to each other so that a dynamic brake is applied to the motor 3". The torque prediction value is calculated for each predetermined cycle time (for example, 1 ms).

Figure 3A:
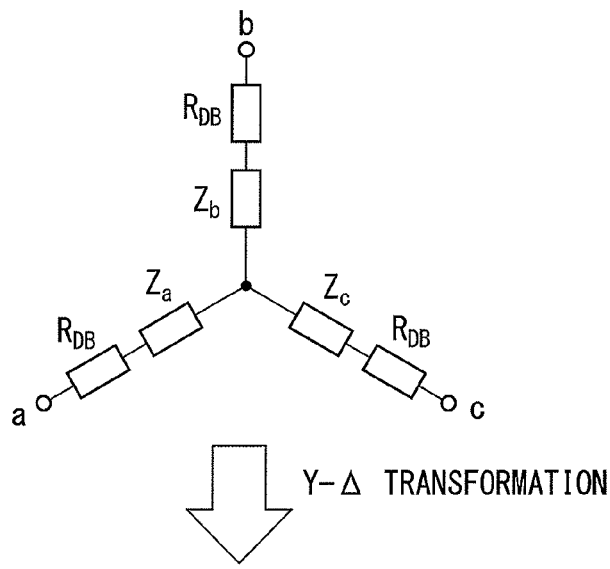
FIG. 3A is a circuit diagram illustrating a calculation method of a torque prediction value, which illustrates a Y connection of a motor when a dynamic brake resistance is connected.
Figure 3B:
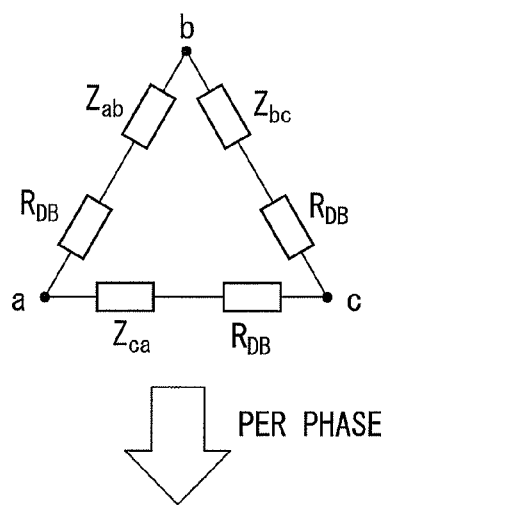
FIG. 3B is a circuit diagram illustrating a calculation method of a torque prediction value, which illustrates the wiring when the Y connection illustrated in FIG. 3A is transformed to a delta connection.
Figure 3C:
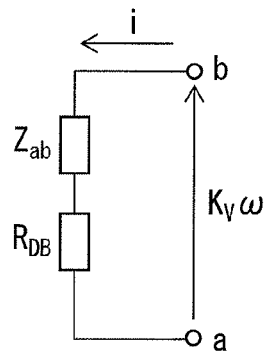
FIG. 3C is a circuit diagram illustrating a calculation method of a torque prediction value, which illustrates the wiring per phase in the delta connection illustrated in FIG. 3B.

Then, calculation of the torque prediction value will be described with reference to FIGS. 3A to 3C. FIGS. 3A to 3C are circuit diagrams illustrating a calculation method of the torque prediction value. FIG. 3A illustrates a Y connection of the motor when the dynamic brake resistance is connected, FIG. 3B illustrates the wiring when the Y connection illustrated in FIG. 3A is transformed to a delta connection, and FIG. 3C illustrates the wiring per phase in the delta connection illustrated in FIG. 3B. Three phase wiring in the three phase motor 3 is wired using the Y connection (also referred to as star connection) as illustrated in FIG. 3A. $Z_a$, $Z_b$, and $Z_c$ denote impedances of each of the phases, and $R_{DB}$ denotes a resistance value of the dynamic brake resistance 7 electrically connected via the switching unit 13 with respect to a winding of each of the phases a, b, and c. The Y connection illustrated in FIG. 3A is subjected to Y-delta (Δ) transformation to be the delta connection as illustrated in FIG. 3B. Then, if "$Z_a + Z_{DB}$" is substituted by $Z_a'$, "$Z_b + Z_{DB}$" is substituted by $Z_b'$, and "$Z_c + Z_{DB}$" is substituted by $Z_c'$, expression 5 holds true.

$$Z'_{ab} = \frac{Z'_a Z'_b + Z'_b Z'_c + Z'_c Z'_a}{Z'_c}$$

$$Z'_{bc} = \frac{Z'_a Z'_b + Z'_b Z'_c + Z'_c Z'_a}{Z'_a}$$

$$Z'_{ca} = \frac{Z'_a Z'_b + Z'_b Z'_c + Z'_c Z'_a}{Z'_b} \quad (5)$$

In expression 5, substitution as represented by expression 6 is made so that the delta connection as illustrated in FIG. 3B is obtained.

$$Z_{ab} = Z'_{ab} - R_{DB}$$

$$Z_{bc} = Z'_{bc} - R_{DB}$$

$$Z_{ca} = Z'_{ca} - R_{DB} \quad (6)$$

FIG. 3C illustrates a state where the wiring per phase (phase ab) of the delta connection as illustrated in FIG. 3B is taken out.

Assuming that the winding current (phase ab) of the motor 3 is i, the angular velocity detected by the velocity detection unit 17 is ω, and a counter electromotive force coefficient of the motor 3 is $K_V$, expression 7 holds true.

$$K_V \omega = Re\{(Z_{ab} + R_{DB})i\} \quad (7)$$

Thus, assuming that the torque constant is $K_T$, a torque prediction value $T_{DB}$ is represented by Expression 8. In Expression 8, Re represents a real part of a complex number.

$$T_{DB} = Re\{K_T i\} \quad (8)$$
$$= Re\{K_V K_T \omega (Z_{ab} + R_{DB})^{-1}\}$$

Thus, the torque prediction value $T_{DB}$ is calculated.

Returning to FIG. 1, the torque comparison unit 19 compares the torque limit value set by the torque limit value setting unit 15 with the torque prediction value $T_{DB}$ calculated by the torque prediction value calculation unit 18. As described above, the torque prediction value $T_{DB}$ is calculated for each predetermined cycle time by the torque prediction value calculation unit 18, in response to which the torque comparison unit 19 compares the torque limit value with the torque prediction value $T_{DB}$ for each predetermined cycle time.

When as a result of comparison by the torque comparison unit 19, the torque limit value (the first torque limit value $T_{lim1}$ or the second torque limit value $T_{lim2}$) set by the torque limit value setting unit 15 is determined to be greater than the torque prediction value $T_{DB}$ calculated by the torque prediction value calculation unit 18, it is meant that not by the dynamic brake (deceleration by hardware) but by the "deceleration by control", a deceleration torque generated in the motor 3 is greater so that the switch unit 13 switches the electrical connection destination of the motor 3 to the amplifier 5. Thereby, the torque command limit unit 16 limits the torque command to the torque limit value set by the torque limit value setting unit 15, and the amplifier 5 controls a switching operation of each semiconductor switching element in the amplifier 5 in accordance with a switching command created based on the torque limit value, and performs such an electric power conversion operation so as to generate a deceleration torque in the motor 3, and accordingly a deceleration torque is generated in the motor 3 and the motor 3 is decelerated.

Further, when as a result of comparison by the torque comparison unit 19, the torque limit value set by the torque limit value setting unit 15 is determined to be less than the torque prediction value $T_{DB}$ calculated by the torque prediction value calculation unit 18, it is meant that not by the "deceleration by control" but by the dynamic brake (deceleration by hardware), a deceleration torque generated in the motor 3 is greater so that the switch unit 13 switches the electrical connection destination of the motor 3 to the dynamic brake resistance 7. Thereby, a short circuit occurs between the input terminals of the motor 3 (between the phases of the motor winding) by the dynamic brake resistance 7, the motor 3 rotating under its own inertia functions as an electric generator, a current thereby generated flows into the dynamic brake resistance 7 and is consumed as Joule heat, and accordingly a deceleration torque is generated in the motor 3 and the motor 3 decelerates.

Thus, during a power failure of the alternating current power source 2, to stop the motor 3 in a time as short as possible while avoiding generation of the low voltage alarm, a magnitude relationship between the torque limit value set in accordance with a value of the DC link voltage and the torque prediction value $T_{DB}$ is determined, and from between the "deceleration by control" and the dynamic brake (deceleration by hardware), a deceleration method which allows a greater deceleration torque to be generated is selected.

FIG. 4 is a flowchart illustrating an operation flow of the motor control device according to the embodiment.

When the motor 3 is controlled by the motor control device 1, first, in step S101, the power failure detection unit 11 detects the presence or absence of occurrence of a power failure of the alternating current power source 2. If the power failure detection unit 11 detects a power failure of the alternating current power source 2, the power failure detection signal indicating the detection of the power failure is transmitted to the torque command limit unit 16, and then a process proceeds to step S102.

In step S102, the voltage comparison unit 14 determines whether a value of the DC link voltage detected by the DC link voltage detection unit 12 is no less than the predetermined threshold value. When the value of the DC link voltage is no less than the predetermined threshold value, a process proceeds to step S103, and when the value of the DC link voltage is less than the predetermined threshold value, a process proceeds to step S104.

In step S103, the torque limit value setting unit 15 sets the second torque limit value $T_{lim2}$.

In step S104, the torque limit value setting unit 15 sets the first torque limit value $T_{lim1}$.

In step S105, the torque prediction value calculation unit 18 calculates a deceleration torque which is to be generated in the motor 3 when it is assumed that "the motor 3 rotates at the angular velocity detected by the velocity detection unit 17, while the motor 3 and the dynamic brake resistance 7 are electrically connected to each other so that a dynamic brake is applied to the motor 3" as the torque prediction value $T_{DB}$ regardless of whether the electrical connection destination of the motor 3 via the switch unit 13 is the amplifier 5 or the dynamic brake resistance 7.

In step S106, the torque comparison unit 19 compares the torque limit value set by the torque limit value setting unit 15 and the torque prediction value $T_{DB}$ calculated by the torque prediction value calculation unit 18. As a result of comparison by the torque comparison unit 19, when the torque limit value is greater than the torque prediction value $T_{DB}$, an advance to step S107 is made, and when the torque limit value is less than the torque prediction value $T_{DB}$, an advance to step S109 is made.

In step S107, the switch unit 13 switches the electrical connection destination of the motor 3 to the amplifier 5.

In step S108 following step S107, the torque command limit unit 16 limits a torque command generated by the torque command generation unit 20 to the second torque limit value $T_{lim2}$ as set in step S103 or the first torque limit value $T_{lim1}$ as set in step S104. Thereby, the amplifier (inverter) 5 controls a switching operation of each semiconductor switching element in the amplifier 5 in accordance with a switching command generated based on the torque limit value as set, and performs such an electric power conversion operation as to generate a deceleration torque in the motor 3. Accordingly, the deceleration torque is generated in the motor 3 and the motor 3 decelerates (step S111).

In step S109, the switch unit 13 switches the electrical connection destination of the motor 3 to the dynamic brake resistance 7.

In step S110 following step S109, a short circuit occurs between the input terminals of the motor 3 (between the phases of the motor winding) by the dynamic brake resistance 7, the motor 3 rotating under its own inertia functions as an electric generator, a current thereby generated flows into the dynamic brake resistance 7 and is consumed as Joule heat, and accordingly a deceleration torque is generated in the motor 3 and the motor 3 decelerates (step S111).

In step S112, whether the motor 3 has come to a complete stop is determined. Such a determination may be performed, for example, by a master control means (unillustrated) based on an angular velocity detected by the velocity detection unit 17. When the motor 3 has not come to a complete stop, a process returns to step S102.

After a power failure of the alternating current power source 2 is detected in step S101, processes of steps S102 to S112 are repeatedly performed until in step S112, a determination in which the motor 3 has come to a complete stop is made. Such a repetition cycle time is identical to a cycle time of torque prediction calculation by the torque prediction value calculation unit 18. In the meantime, in accordance with a value of the DC link voltage, the first torque limit value $T_{lim1}$ or the second torque limit value $T_{lim2}$ is set, and in accordance with a magnitude relationship between the torque limit value and the torque prediction value $T_{DB}$ as set, the "deceleration by control" using the torque command to the amplifier (inverter) 5 of steps S107 and S108 or the "deceleration by hardware" using the dynamic brake resistance 7 of steps S109 and S110 is selected. From between the "deceleration by control" using the torque command to the amplifier (inverter) 5 and the "deceleration by hardware" using the dynamic brake resistance 7, a deceleration method which allows a greater deceleration torque to be generated in the motor 3 is selected so that the stopping distance (braking distance) of the motor 3 can be shortened while avoiding the generation of the low voltage alarm.

Note that the voltage comparison unit 14, the torque limit value setting unit 15, the torque command limit unit 16, the torque prediction value calculation unit 18, the torque comparison unit 19, and the torque command generation unit 20 as described above for example may be constructed in a software program format, or may be constructed by combination of various kinds of electronic circuits and a software program. For example, when these units are constructed in a software program format, an arithmetic processing device in the motor control device 1 is operated in accordance such software program, whereby a function of each unit as described above can be realized. Alternatively, the voltage comparison unit 14, the torque limit value setting unit 15, the torque command limit unit 16, the torque prediction value calculation unit 18, the torque comparison unit 19, and the torque command generation unit 20 may be realized as a semiconductor integrated circuit to which a software program that realizes a function of each unit is written.

According to the present invention, in the motor control device which controls a motor in a machine tool or an industrial machine, the stopping distance of the motor can be shortened while generation of a low voltage alarm after a power failure of a power source is avoided. According to the present invention, from between the "deceleration by control" using a torque command to the amplifier (inverter) and the "deceleration by hardware" using the dynamic brake resistance, a deceleration method which allows a greater deceleration torque to be generated in the motor is selected so that the stopping distance of the motor can be shortened (the motor is stopped in a short time) while avoiding the generation of the low voltage alarm.

What is claimed is:

1. A motor control device which controls a motor in a machine tool or an industrial machine, the motor control device comprising:
   a power failure detection unit that detects a power failure of a power source which supplies electric power for driving the motor;
   a DC link voltage detection unit that detects a value of a DC link voltage applied to an amplifier which drives the motor;
   a switch unit which switches a connection destination of the motor to the amplifier or a dynamic brake resistance;
   a voltage comparison unit which compares the value of the DC link voltage with a predetermined threshold value;
   a torque limit value setting unit which sets a torque limit value for decelerating the motor in accordance with a result of comparison by the voltage comparison unit;
   a torque command limit unit which limits a torque command for driving the motor to the torque limit value when the motor is connected to the amplifier when the power failure is detected;
   a velocity detection unit which detects an angular velocity of the motor;
   a torque prediction value calculation unit which calculates, using the angular velocity detected by the velocity detection unit, a deceleration torque of the motor that is predicted to be generated when the motor rotating at the angular velocity is connected to the dynamic brake resistance as a torque prediction value; and
   a torque comparison unit which compares the torque limit value set by the torque limit value setting unit with the torque prediction value calculated by the torque prediction value calculation unit, wherein
   in accordance with a result of comparison by the torque comparison unit, the switch unit switches the connection destination of the motor when the power failure is detected to the amplifier or the dynamic brake resistance.

2. The motor control device according to claim 1, wherein as a result of comparison by the torque comparison unit, the switch unit switches the connection destination of the motor to the amplifier when the torque limit value is greater than the torque prediction value, and switches the connection destination of the motor to the dynamic brake resistance when the torque limit value is less than the torque prediction value.

3. The motor control device according to claim 1, wherein assuming that the angular velocity detected by the velocity detection unit is $\omega$, a counter electromotive force coefficient of the motor is $K_V$, a torque constant is $K_T$, an impedance per phase when a Y connection of a winding in the motor is transformed to a delta connection is Z, a resistance value of the dynamic brake resistance is $R_{DB}$, and the torque prediction value is $T_{DB}$, the torque prediction value calculation unit calculates the torque prediction value $T_{DB}$ based on the below expression $$T_{DB}=Re\{K_V K_T \omega (Z+R_{DB})^{-1}\}$$

4. The motor control device according to claim 1, wherein as a result of comparison by the voltage comparison unit, the torque limit value setting unit sets a first torque limit value when the value of the DC link voltage is less than the predetermined threshold value, and sets a second torque limit value greater than the first torque limit value when the value of the DC link voltage is no less than the predetermined threshold value.

5. The motor control device according to claim 4, wherein the predetermined threshold value is a fixed value which is set in advance.

6. The motor control device according to claim 4, further comprising: a retention unit which retains a value of the DC link voltage detected by the DC link voltage detection unit for each predetermined cycle time, wherein
   the predetermined threshold value is a value of the DC link voltage that has been detected in a cycle time previous to a cycle time, in which the DC link voltage as used for a comparison by the voltage comparison unit is detected, and has been retained by the retention unit.

7. The motor control device according to claim 4, wherein as the first torque limit value when the value of the DC link voltage is less than the predetermined threshold value, a torque limit value setting unit sets such torque limit value that is determined based on the angular velocity detected by the velocity detection unit and allows a decrease of the DC link voltage to be restrained.

8. The motor control device according to claim 7, wherein assuming that the angular velocity detected by the velocity detection unit is $\omega$, a counter electromotive force coefficient of the motor is $K_V$, a torque constant is $K_T$, a winding resistance is R, and the angular velocity is $\omega$, the torque limit value setting unit sets the first torque limit value in such a manner as to be a value not greater than $T_{upper}$ which is calculated based on the below expression $$T_{upper} = \frac{K_V K_T \omega}{R}$$

9. The motor control device according to claim 4, wherein the torque limit value setting unit sets the second torque limit value when the value of the DC link voltage is no less than the predetermined threshold value in such a manner as to be a value not greater than a maximum torque allowable for the motor.

* * * * *